2,826,569

RESINOUS COMPOSITIONS CONTAINING BUTADIENE-1,3 AND POLYALKYLPYRIDINES AND PROCESS OF PREPARING THEM

Francis E. Cislak, Indianapolis, Ind., assignor to Reilly Tar & Chemical Corporation, Indianapolis, Ind., a corporation of Indiana No Drawing. Application September 7, 1954
Serial No. 454,609

8 Claims. (Cl. 260—94.2)

This invention relates to synthetic polymers containing a pyridine ring in their molecular make-up and to the process of preparing them. More particularly, it relates to polymers prepared by the interaction of polyalkylpyridines with conjugated dienes.

In U. S. Patent 2,402,020 there are described various elastomers containing pyridine rings in their molecular structure. The elastomers described therein are prepared by the copolymerization of vinylpyridine with various monomers, such as butadiene, styrene, acrylonitrile, and the like. Subsequent to the granting of the above patent, many other patents were issued to various inventors relating to vinylpyridine copolymers. Today, vinylpyridine copolymers are widely used in the rubber industry, in the synthetic fiber industry, for the manufacture of photographic film, etc. Because of their unique properties, they continue to find more uses in spite of their relatively high price.

I found that I can prepare polymers containing the pyridine nucleus by reacting a polyalkylpyridine, such, for example, as 2,6-lutidine, with a conjugated diene as, for example, 1:3-butadiene. The condensation of the polyalkylpyridine and the conjugated diene is brought about by alkali metals as, for example, sodium.

The polyalkylpyridines which are particularly useful for practicing my invention are 2,6-lutidine, 2,4,6-collidine, 2,4-lutidine, 2-methyl-4-ethylpyridine, 2,6 diethylpyridine. All of these pyridines are characterized by the presence of a —$CH_2$— grouping in the 2- position and in either or both the 4- position, and the 6- position. I prefer to use the polyalkylpyridines which have a —$CH_2$— grouping in those positions because of their greater reactivity, but I may use any polyalkylpyridine having at least two —$CH_2$— groupings attached to the pyridine nucleus.

For economic reasons I prefer to use 1:3-butadiene for copolymerization with the polyalkylpyridines. I may, however, use other conjugated dienes, such for example, as isoprene or 2,3-dimethylbutadiene.

The examples cited below are illustrative of the manner in which my invention may be practiced:

Example 1

A mixture of two moles of 2,6-lutidine, four moles of 1:3-butadiene and ⅓ mole of sodium is prepared in a pressure vessel equipped with an agitator. The mixture is heated, under pressure, to a temperature of from about 100–120° C.; it is agitated continually. The interaction of the 2,6-lutidine and the butadiene generates sufficient heat to maintain the reaction mixture at this temperature. As the reaction proceeds, the pressure in the vessel gradually drops and the reaction is considered complete when the pressure falls to near atmospheric. The mixture is then cooled and any residual pressure is released. Then, about one mole of methanol or water is added to "kill" the sodium. The resultant mixture is then subjected to distillation under vacuum to remove unreacted 2,6-lutidine, butadiene, and other volatile products. The copolymer of 2,6-lutidine and butadiene remains as a distillation residue in the reaction vessel and is removed therefrom while still hot. The copolymer is allowed to cool in shallow pans.

The presence of the pyridine ring nitrogen in the resin molecule makes it particularly receptive of dyes. The incorporation of this resin in the melt used to spin polyacrylonitrile fibers enhances the dyeing properties of these fibers, commercially known as Orlon, Acrilan, and Dynel.

In place of using sodium, I may use other alkali metals, or I may use sodio-2,6-lutidine made by the reaction of 2,6-lutidine and sodamide.

The ratio of 2,6-lutidine to butadiene may be varied widely; the lower the ratio, the more elastic the copolymer.

More rigid copolymers may be formed by reacting 2,4,6-collidine with butadiene. These may be formed in accordance with Example 2.

Example 2

Three moles of 1:3-butadiene are cooled to about 0° C. To this cold butadiene there is gradually added one mole of a mixture composed of 75% 2,4,6-collidine and 25% of sodio-2,4,6-collidine (made by reacting sodamide with 2,4,6-collidine). The temperature of the reaction mixture is maintained at about 0° C. After all of the sodio-collidine-collidine mixture has been added, the temperature of the reaction mixture is allowed to rise gradually until a temperature of about 30° C. is reached. It is held at this temperature for about two hours. Then, the temperature is raised to about 100° C. The sodium is "killed" with methanol and the mixture subjected to vacuum distillation to remove the volatile materials present. The residue is the desired copolymer of 2,4,6-collidine and 1:3-butadiene. It is removed from the reaction vessel and is cooled in shallow pans.

The 2,4,6-collidine-butadiene copolymers are useful in the preparation of metal protecting paints. The pyridine ring nitrogen in the resin matrix seems to be responsible for the strong affinity of these copolymers for metals.

Example 3

The process of Example 1 and of Example 2 is repeated save that 2,4-lutidine is used in place of the 2,6-lutidine of Example 1 and in place of the 2,4,6-collidine of Example 2.

In general, I prefer to copolymerize an individual polyalkylpyridine with a diene. However, if I so desire, I may copolymerize a mixture of polyalkylpyridines with a diene. For instance, in the synthesis of picolines from acetylene and ammonia there is obtained a by-product of polyalkylpyridines having a distillation range of from 150–170° C. Such a mixture when copolymerized with butadiene yields a copolymer which is effective for inhibiting the action of dilute sulfuric acid on steel.

I claim as my invention:

1. The process of making a resinous composition which comprises reacting a conjugated butadiene with a pyridine compound of the class consisting of 2,6-lutidine, 2,4,6-collidine, and 2,4-lutidine.

2. The process of making a resinous composition which comprises reacting a mixture of 1:3-butadiene, sodium, and a compound of the class consisting of 2,6-lutidine, 2,4,6-collidine, and 2,4-lutidine and recovering the resultant copolymer.

3. The process of making a resinous composition which comprises reacting a mixture of 2,4,6-collidine, 1:3-butadiene, and sodio-2,4,6-collidine.

4. The process of making a resinous composition which comprises mixing 1:3-butadiene with a compound of the class consisting of 2,6-lutidine, 2,4,6-collidine, and 2,4-lutidine and mixtures thereof and with a compound selected from the group consisting of sodium, sodio-2,6-lutidine, sodio-2,4,6-collidine, and sodio-2,4-lutidine, heating the resultant mixture under pressure to cause polymerization and recovering the resultant resinous product.

5. The product obtained by the process of claim 1.
6. The product obtained by the process of claim 2.
7. The product obtained by the process of claim 2 in which the pyridine compound used is 2,6-lutidine.
8. The product obtained by the process of claim 2 in which the pyridine compound used is 2,4-lutidine.

References Cited in the file of this patent

UNITED STATES PATENTS

| | | |
|---|---|---|
| 2,549,651 | Weisgerber | Apr. 17, 1951 |
| 2,640,042 | Howland et al. | May 16, 1953 |
| 2,670,390 | Pines et al. | Feb. 23, 1954 |
| 2,746,943 | Pritchard | May 22, 1956 |